US012246519B2

(12) United States Patent
Vandeparre et al.

(10) Patent No.: US 12,246,519 B2
(45) Date of Patent: Mar. 11, 2025

(54) MULTILAYER COATING FOR COVERING VEHICLE BODY PARTS

(71) Applicant: Avery Dennison Corporation, Mentor, OH (US)

(72) Inventors: Hugues Vandeparre, Thoricourt (BE); Regis Barbieux, Braine-le-Comte (BE); Jean-Christophe Minor, Bassilly (BE)

(73) Assignee: Avery Dennison Corporation, Mentor, OH (US)

( * ) Notice: Subject to any disclaimer, the term of this patent is extended or adjusted under 35 U.S.C. 154(b) by 73 days.

(21) Appl. No.: 18/167,963

(22) Filed: Feb. 13, 2023

(65) Prior Publication Data

US 2023/0191758 A1     Jun. 22, 2023

Related U.S. Application Data

(62) Division of application No. 17/043,822, filed as application No. PCT/US2019/024596 on Mar. 28, 2019, now abandoned.

(30) Foreign Application Priority Data

Mar. 30, 2018  (EP) ..................... 18165300

(51) Int. Cl.
| | | |
|---|---|---|
| *B32B 27/08* | (2006.01) | |
| *B29C 71/02* | (2006.01) | |
| *B32B 7/12* | (2006.01) | |
| *B32B 27/30* | (2006.01) | |
| *B32B 27/36* | (2006.01) | |
| *C08J 7/04* | (2020.01) | |
| *C08J 7/043* | (2020.01) | |
| *C08J 7/046* | (2020.01) | |
| *C08J 7/18* | (2006.01) | |
| *C09J 7/29* | (2018.01) | |

(52) U.S. Cl.
CPC ............... *B32B 27/08* (2013.01); *B32B 7/12* (2013.01); *B32B 27/304* (2013.01); *B32B 27/365* (2013.01); *C08J 7/042* (2013.01); *C08J 7/043* (2020.01); *C08J 7/046* (2020.01); *C08J 7/08* (2013.01); *C08J 7/18* (2013.01); *C09J 7/29* (2018.01); *B32B 2250/02* (2013.01); *B32B 2250/03* (2013.01); *B32B 2250/04* (2013.01); *B32B 2250/05* (2013.01); *B32B 2305/72* (2013.01); *B32B 2307/412* (2013.01); *B32B 2307/584* (2013.01); *B32B 2310/0831* (2013.01); *C08J 2375/06* (2013.01); *C09J 2203/306* (2013.01); *C09J 2301/122* (2020.08); *C09J 2301/162* (2020.08); *C09J 2475/006* (2013.01)

(58) Field of Classification Search
CPC ......... B32B 27/08; B32B 7/12; B32B 27/304; B32B 27/365; B32B 2250/02; B32B 2250/03; B32B 2250/04; B32B 2250/05; B32B 2305/72; B32B 2307/412; B32B 2307/584; B32B 2310/0831; B32B 27/40; C08J 7/042; C08J 7/043; C08J 7/046; C08J 7/08; C08J 7/18; C08J 2375/06; C08J 2375/04; C08J 2475/04; C08J 7/04; C09J 7/29; C09J 2301/122; C09J 2301/162; C09J 2475/006; C09J 2203/306; C08L 75/04; B05D 3/0254; B05D 3/065; B05D 7/50; B05D 7/52; B05D 7/53; B05D 7/56; B05D 7/57; B05D 2201/00; B05D 2201/02; B05D 2201/04; B05D 2503/00
See application file for complete search history.

(56) References Cited

U.S. PATENT DOCUMENTS

| | | | |
|---|---|---|---|
| 4,937,147 A | 6/1990 | Cartier et al. | |
| 5,034,275 A * | 7/1991 | Pearson | B29C 51/14 428/483 |

(Continued)

FOREIGN PATENT DOCUMENTS

| | | |
|---|---|---|
| CN | 101522417 | 9/2009 |
| CN | 104098999 | 10/2014 |

(Continued)

OTHER PUBLICATIONS

International Search Report and Written Opinion dated May 20, 2019 issued in corresponding IA No. PCT/US2019/024596 filed Mar. 28, 2019.
International Preliminary Report on Patentability dated Oct. 6, 2020 issued in corresponding IA No. PCT/US2019/024596 filed Mar. 28, 2019.
Machine translation of CN104098999 (Year: 2014).

*Primary Examiner* — William P Fletcher, III

(57) ABSTRACT

The present invention relates to a method for manufacturing a multilayer coating for covering vehicle body parts. The method comprises providing a polymeric facestock layer (3) providing a polymeric top coat layer (4), providing a polymeric adhesive layer (2), and sandwiching the polymeric facestock layer (3) between the polymeric top coat layer (4) comprising at least partially cross-linked polyurethane and the polymeric adhesive layer (2) between a polymeric top coat layer (4) and a polymeric adhesive layer (2). The partially cross-linked polyurethane is a reaction product of a composition comprising a first part and a second part, wherein: the first part comprises between 0.1 and 99.9 wt. % of solvent- or waterborne thermally curable polyurethane precursor material, as based on the total weight of said composition; and the second part comprises between 0.1 and 99.9 wt. % of UV-curable polyurethane precursor material, as based on the total weight of said composition.

13 Claims, 2 Drawing Sheets

(56) References Cited

U.S. PATENT DOCUMENTS

Figure 1:
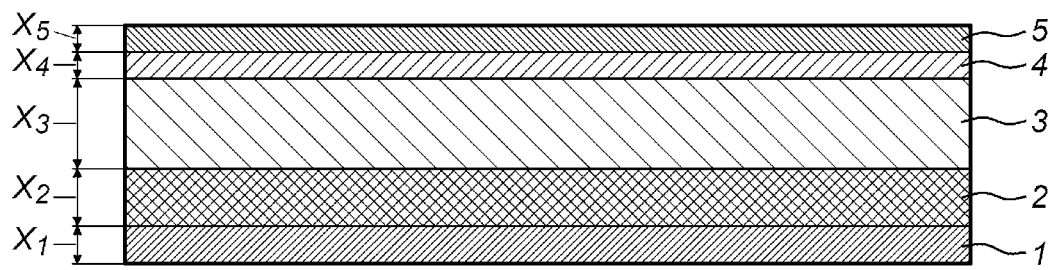

| | | | |
|---|---|---|---|
| 5,264,532 A * | 11/1993 | Bernard | C08F 220/1808 526/278 |
| 5,268,215 A * | 12/1993 | Krenceski | C08G 18/61 428/447 |
| 5,798,409 A | 8/1998 | Ho | |
| 5,922,473 A | 7/1999 | Muthiah et al. | |
| 6,258,918 B1 | 7/2001 | Ho et al. | |
| 6,747,088 B1 | 6/2004 | Schwalm et al. | |
| 6,777,090 B2 | 8/2004 | Baumgart et al. | |
| 6,815,501 B2 | 11/2004 | Flosbach et al. | |
| 6,835,759 B2 | 12/2004 | Bradford et al. | |
| 6,949,591 B1 | 9/2005 | Allard et al. | |
| 7,034,063 B2 | 4/2006 | Nienhaus et al. | |
| 7,144,955 B2 | 12/2006 | Grace et al. | |
| 7,479,308 B2 | 1/2009 | Baumgart et al. | |
| 7,915,321 B2 | 3/2011 | Baumgart et al. | |
| 8,128,779 B2 | 3/2012 | Ho et al. | |
| 8,765,263 B2 | 7/2014 | Ho et al. | |
| 2002/0123562 A1 | 9/2002 | Stender et al. | |
| 2003/0153673 A1 | 8/2003 | Schwalm et al. | |
| 2003/0207956 A1 | 11/2003 | Balch et al. | |
| 2004/0058083 A1 | 3/2004 | Lettmann et al. | |
| 2008/0166569 A1 | 7/2008 | Gasworth et al. | |
| 2009/0012230 A1 * | 1/2009 | Bedri | C08G 18/4833 524/872 |
| 2010/0297376 A1 | 11/2010 | Shi et al. | |
| 2011/0045306 A1 | 2/2011 | Johnson et al. | |
| 2012/0088054 A1 | 4/2012 | Chacko et al. | |
| 2012/0160402 A1 | 6/2012 | Ho et al. | |
| 2015/0184038 A1 | 7/2015 | Schaner et al. | |
| 2019/0154173 A1 | 5/2019 | Sha et al. | |

FOREIGN PATENT DOCUMENTS

| | | |
|---|---|---|
| WO | 2008/042883 | 4/2008 |
| WO | 2012/141723 | 2/2013 |

* cited by examiner

FIGURES

MULTILAYER COATING FOR COVERING VEHICLE BODY PARTS

CROSS-REFERENCE TO RELATED APPLICATIONS

The present application is a division of U.S. patent application Ser. No. 17/043,822, which is now abandoned, and which was filed on Sep. 30, 2020, which is a 371 of International Application No. PCT/US2019/024596, which was published in English on Oct. 3, 2019, which claims the benefit of European Patent Application No. 18165300.7 filed Mar. 30, 2018, all of which are incorporated herein by reference in their entireties.

STATEMENT REGARDING FEDERALLY SPONSORED RESEARCH OR DEVELOPMENT

Not Applicable.

JOINT RESEARCH AGREEMENT PARTIES

Not Applicable.

INCORPORATION-BY-REFERENCE OF MATERIAL SUBMITTED

Not Applicable.

STATEMENT REGARDING PRIOR DISCLOSURE BY INVENTOR OR JOINT INVENTOR

Not Applicable.

TECHNICAL FIELD

Statement Regarding Federally Sponsored Research or Development

Not Applicable.

JOINT RESEARCH AGREEMENT PARTIES

Not Applicable.

INCORPORATION-BY-REFERENCE OF MATERIAL SUBMITTED

Not Applicable.

STATEMENT REGARDING PRIOR DISCLOSURE BY INVENTOR OR JOINT INVENTOR

Not Applicable.

FIELD OF THE INVENTION

The invention pertains to a multilayer coating for covering vehicle body parts.

BACKGROUND OF THE INVENTION

Multilayer coatings for covering vehicle body parts are known from the prior art. Such multilayer coatings function as a protective film and protect such body parts from environmental damage, such as scratching, as a result of impact with projectiles and other articles. As a result, to protect the substrate from such damage, the substrate may be coated with a clear and optically transparent "self-healing" multilayer coating that comprises a flexible polyurethane material. These coatings are often described as "self-healing" coatings because of their ability to return to their original shape and appearance, i.e. high scratch resistance or anti-scratch properties, after being deformed. Furthermore, it is desired that such self-healing coatings show an adequate solvent resistance. It is a challenge to obtain such "self-healing" coatings with adequate stretchability, anti-scratch properties and also a sufficient solvent resistance.

WO 2008/042883 describes a method of making a multilayer protective film, comprising: (a) forming a polyurethane layer comprising an at least partially crosslinked polyurethane, the at least partially crosslinked polyurethane comprising at least one of a polyester-based polyurethane or a polycarbonate-based polyurethane; (b) forming a thermoplastic polyurethane layer comprising a polycaprolactone-based thermoplastic polyurethane; (c) forming a pressure-sensitive adhesive layer comprising a pressure sensitive adhesive; (d) bonding one major surface of the polyurethane layer to one major surface of the thermoplastic polyurethane layer; and (e) bonding the pressure-sensitive adhesive layer to an opposite major surface of the thermoplastic polyurethane layer; wherein the thermoplastic polyurethane layer is sandwiched between the polyurethane layer and the pressure-sensitive adhesive layer. Said polyurethane layer may comprise a water-based polyurethane and/or a solvent-based polyurethane as an at least partially crosslinked polyurethane. The multilayer film may be used to protect painted surfaces of vehicle body parts.

The multilayer protective film according to WO 2008/042883 shows the problem that, although offering sufficient self-healing properties and stretchability, the film lacks in providing adequate anti-scratch and solvent resistance properties.

The invention aims to resolve at least some of the problems mentioned above.

BRIEF SUMMARY OF THE INVENTION

In a first aspect, the present invention concerns a multilayer coating for covering vehicle body parts, comprising a polymeric facestock layer 3 which is located between a polymeric top coat layer 4 and a polymeric adhesive layer 2, the top coat layer 4 comprising at least partially cross-linked polyurethane, wherein the at least partially cross-linked polyurethane is the reaction product of a composition comprising a first part and a second part, wherein:
  the first part comprises between 0.1 and 99.9 wt. % of solvent- or waterborne thermally curable polyurethane precursor material, as based on the total weight of said composition; and
  the second part comprises between 0.1 and 99.9 wt. % of UV-curable polyurethane precursor material, as based on the total weight of said composition.

The top coat layer 4 comprising at least partially cross-linked polyurethane provides excellent stretchability, anti-scratch and solvent resistance properties. As a result, the multilayer coating according to the present invention provides excellent stretchability, anti-scratch and solvent resistance properties and is thus especially suitable for covering and protecting vehicle body parts.

In a second aspect, the present invention concerns a method for manufacturing a multilayer coating for covering vehicle body parts, comprising the steps of:

providing a polymeric facestock layer 3;
providing a polymeric adhesive layer 2;
providing a polymeric top coat layer 4;
sandwiching the facestock layer 3 between the top coat layer 4 and the adhesive layer 2,
wherein the step of providing the top coat layer 4 comprises the following steps:
adding thermally curable polyurethane precursor material to solvent or water to obtain a first dispersion or solution;
adding UV-curable polyurethane precursor material to the solvent- or waterborne polyurethane obtained in step a) to obtain a second dispersion or solution;
coating the mixture obtained in step 2 on the polymeric facestock 3;
heating the mixture once coated in such a way that water and/or solvent is evaporated and the polyurethane described in step a) is at least partially cross-linked; and
submitting the mixture resulting from step d) to UV radiation in such a way that the polyurethane described in step b) is at least partially cross-linked.

The solvent- or waterborne thermally curable polyurethane hinders the full curing of the UV-curable polyurethane precursor material. In such way, a top coat layer 4 comprising at least partially cross-linked polyurethane is formed that provides excellent stretchability, anti-scratch and solvent resistance properties. As a result, a multilayer coating resulting from the method according to the second aspect of the present invention provides excellent stretchability, anti-scratch and solvent resistance properties and is thus especially suitable for covering and protecting vehicle body parts.

BRIEF DESCRIPTION OF THE SEVERAL VIEW OF THE DRAWINGS

FIGS. 1-6 show preferred embodiments of a multilayer coating according to the present invention.

DETAILED DESCRIPTION OF THE INVENTION

As used herein, the following terms have the following meanings:

The term "polyurethane", as used herein, refers to the product of the reaction of a polyisocyanate with a polyol.

The term "polyisocyanate", as used herein, refers to an organic isocyanate having at least two isocyanate groups, such as, for example, a diisocyanate, triisocyanate, etc. Examples of suitable polyisocyanates in the context of the present invention include aromatic diisocyanates, such as, for example, 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate; (4,4'-diisocyanato-3,3',5,5'-tetraethyl) diphenylmethane; 4,4'-diisocyanato-3,3'-dimethoxybiphenyl (o-dianisidine diisocyanate); 5-chloro-2,4-toluene diisocyanate, and 1-chloromethyl-2,4-diisocyanato benzene); aromatic-aliphatic diisocyanates, such as, for example, m-xylylene diisocyanate and tetramethyl-m-xylylene diisocyanate; aliphatic diisocyanates, such as, for example, 1,4-diisocyanatobutane; 1,6-diisocyanatohexane; 1,12-diisocyanatododecane; and 2-methyl-1,5-diisocyanatopentane; cycloaliphatic diisocyanates, such as, for example, methylenedicyclohexylene-4,4'-diisocyanate, 3-isocyanatomethyl-3,5,5-trimethylcyclohexyl isocyanate (isophorone diisocyanate), 2,2,4-trimethylhexyl diisocyanate; and cyclohexylene-1,4-diisocyanate; polymeric or oligomeric compounds, such as, for example, polyoxyalkylene, polyester, polybutadiene, and the like, terminated by two or more isocyanate functional groups, for example, the diurethane of toluene-2,4-diisocyanate-terminated polypropylene oxide glycol; and combinations thereof.

The term "polyol", as used herein, refers to an alcohol having at least two hydroxyl groups, such as, for example, a diol, triol, etc. Examples of suitable polyols in the context of the present invention include polyester polyols, polyether polyols, acrylic polyols, polycaprolactone polyols, polycarbonate polyols, and combinations thereof. The choice of the degree of reactive, for example —OH, functionality, for example difunctional, will generally be selected depending on the degree of cross-linking desired in the resultant polyurethane.

As used herein, the term "colorant" means any substance that imparts color and/or other opacity and/or other visual effect to the multilayer coating.

As used herein, the term "wt. %" is to be understood as percentage by weight.

In a first aspect, the present invention concerns a multilayer coating for covering vehicle body parts, comprising a polymeric facestock layer 3 which is located between a polymeric top coat layer 4 and a polymeric adhesive layer 2, the top coat layer 4 comprising at least partially cross-linked polyurethane, wherein the at least partially cross-linked polyurethane is the reaction product of a composition comprising a first part and a second part, wherein:
the first part comprises between 0.1 and 99.9 wt. % of solvent- or waterborne thermally curable polyurethane precursor material, as based on the total weight of said composition; and
the second part comprises between 0.1 and 99.9 wt. % of UV-curable polyurethane precursor material, as based on the total weight of said composition.

The top coat layer 4 comprising at least partially cross-linked polyurethane provides excellent stretchability, anti-scratch and solvent resistance properties. As a result, the multilayer coating according to the present invention provides excellent stretchability, anti-scratch and solvent resistance properties and is thus especially suitable for covering and protecting vehicle body parts. The top coat layer 4 and the multilayer coating according to the present invention are not to be regarded as obvious for a person skilled in the art, since such person would rather try to optimize solvent-based or UV-based technologies for creating an improved protective coating instead of combining solvent-based and UV-based technologies.

In preferred embodiments, said first and second parts of said composition are combined as such. The resulting combination is later treated by heat and UV-curing, said combination in order to obtain at least partially cross-linked polyurethane.

In preferred embodiments, the at least partially cross-linked polyurethane is only slightly cross-linked, and hence exhibits at least enough melting, or at least enough softening, at room temperature or if heated to a sufficiently high temperature, and thus shows thermoplastic properties. Such thermoplastic slightly cross-linked polyurethane is especially desirable for excellent stretchability of the top coat layer 4. In other preferred embodiments, the at least partially cross-linked polyurethane is heavily cross-linked in such an extent that the polyurethane does exhibit no or limited melting or softening if heated, and thus shows thermoset properties. Such thermoset heavily crosslinked polyurethane is especially desirable for excellent solvent resistance and anti-scratch properties of the top coat layer 4. In other preferred embodiments, the at least partially cross-linked polyurethane is cross-linked moderately, such that a good balance is achieved between excellent stretchability, anti-scratch and solvent resistance properties.

Figure 2:
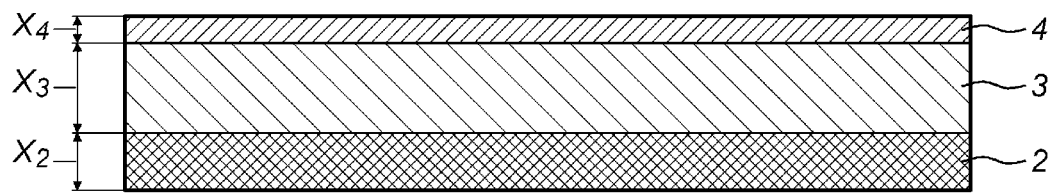

A preferred embodiment of a multilayer coating for covering vehicle body parts according to the first aspect of the present invention, comprising a polymeric facestock layer 3 which is located between a polymeric top coat layer 4 and a polymeric adhesive layer 2, is shown in FIG. 2. Each of these layers 2, 3 and 4 comprises a corresponding layer thickness ×2, ×3, ×4. In preferred embodiments, the layer thickness ×4 of the top coat layer 4 is selected between 1 and 30 μm, more preferably between 5 and 25 μm, and even more preferably between 10 and 20 μm. Said thickness ×4 values of the top coat layer 4 ensure sufficient stretchability, anti-scratch and solvent resistance properties while avoiding an unnecessary thick top coat layer 4. In preferred embodiments, the layer thickness ×3 of the facestock layer 3 is selected between 10 and 300 μm, more preferably between 20 and 200 am and even more preferably between 40 and 160 μm. Said thickness ×3 values of the facestock layer 3 ensure sufficient strength of the multilayer coating while avoiding an unnecessary thick facestock layer 3. In preferred embodiments, the layer thickness ×2 of the adhesive layer 2 is selected between 10 and 200 μm, more preferably between 20 and 150 am and even more preferably between 30 and 100 μm. Said thickness ×2 values of the adhesive layer 2 ensure sufficient adhesion when applying the multilayer coating to a structure, preferably to one or more vehicle body parts, while avoiding an unnecessary thick adhesive layer 2. In preferred embodiments, the adhesive layer 2 is an acrylic-based adhesive. Furthermore, the adhesive layer 2 is preferably a pressure-sensitive adhesive.

Solvents for said solventborne polyurethane precursor material can be formulated with a variety of organic solvents, such as acetone, certain ketones, including methyl ethyl ketone, hydrocarbons, such as toluene and xylene, alcohols, and mixtures thereof.

In a preferred embodiment, the present invention provides a multilayer coating according to the first aspect of the invention, wherein said composition comprises solvent—or waterborne polyurethane precursor material in an amount between 20.0 and 60.0 wt. %, more preferably between 30.0 and 50.0 wt. %, and even more preferably between 32.0 and 42.0 wt. %, and UV-curable polyurethane precursor material in an amount between 40.0 and 80.0 wt. %, more preferably between 50.0 and 70.0 wt. %, and even more preferably between 58.0 and 68.0 wt. %, as based on the total weight of said composition. In a preferred embodiment, the present invention provides a multilayer coating according to the first aspect of the invention, wherein said composition comprises solvent- or waterborne polyurethane precursor material in an amount between 20.0 and 99.9 wt. % and UV-curable polyurethane precursor material in an amount between 0.1 and 80.0 wt. %, as based on the total weight of said composition. Said amounts of solvent- or waterborne polyurethane precursor material and UV-curable polyurethane precursor material are optimally suited for obtaining a top coat layer 4 comprising at least partially cross-linked polyurethane that provides surpassingly excellent stretchability, anti-scratch and solvent resistance properties.

In a preferred embodiment, the present invention provides a multilayer coating according to the first aspect of the invention, wherein the facestock layer 3 comprises a thermoplastic polymer selected from the group comprising polyurethane, polyester and polyvinylchloride. Such thermoplastic polymers are optimally suited to provide a facestock layer 3 with good strength and flexibility properties. In preferred embodiments, the facestock layer 3 comprises one or more thermoplastic polyurethanes with a biphasic structure, i.e. composed of hard and soft segments. The synthesis of these biphasic thermoplastic polyurethanes is mainly based on three major components: (i) long-chain polyols, being defined as polyols with at least three alcohol groups, (ii) short-chain polyols also called chain-extenders, being defined as diols, and (iii) polyisocyanate. The long-chain polyols and the chain-extenders react by poly-addition with the polyisocyanates to form polyurethane. The phase separation occurs due to incompatibility between the hard segments, formed by reaction between the chain extenders and isocyanates, and soft segments, formed by reaction between the long-chain polyols and the isocyanates. The hard and polar segments form domains of about 10 nm based on carbonyl to amino hydrogen bonds whereas the soft segments form amorphous domains. The biphasic structure of the thermoplastic polyurethanes gives the facestock layer 3 good flexibility properties and shape memory behaviour and thus allows the facestock layer 3 to assist in the self-healing properties of the adjacent top coat layer 4. In preferred embodiments, the facestock layer 3 further comprises aliphatic polycaprolactone, which beneficially enhances the hardness of the facestock layer 3. In another preferred embodiment, the facestock layer 3 comprises polyethylene terephthalate, preferably UV-stabilized polyethylene terephthalate.

In a preferred embodiment, the present invention provides a multilayer coating according to the first aspect of the invention, further comprising a protective layer 5 adjacent to the top coat layer 4 and opposite to the facestock layer 3. Said protective layer 5 primarily functions to protect the top coat layer 4 from detrimental environmental conditions, such as from dirt or from hands which manipulate the multilayer coating when it is applied to a structure, preferably to one or more body parts of a vehicle. The multilayer coating is intended to be removed once the multilayer coating is applied to a surface to be coated. In preferred embodiments, the protective layer 5 is a polyester or a polypropylene film. In other embodiments, the protective layer 5 comprises polyvinylidene fluoride, polyurethane, polyvinylchloride or another material. In embodiments, the relief of the protective layer 5 is used to texture the top coat layer 4. In preferred embodiments, the protective layer 5 is a very flat film and the top coat layer 4 is also very flat. In other preferred embodiments, the protective layer 5 is structured with a positive relief. Due to contact between the protective layer and the top coat layer 4, the negative of said positive relief is transferred on the surface of the top coat layer 4, providing an engineered surface of said top coat layer 4. The aim of the engineered surface is to provide a tailor-made visual appearance of the top coat layer 4, which may prove aesthetically desirable.

In a preferred embodiment, the present invention provides a multilayer coating according to the first aspect of the invention, further comprising a liner 1 adjacent to the adhesive layer 2 and opposite to the facestock layer 3. The liner 1 functions to shield of the adhesive layer 2 from the environment. In such way, the adhesive strength of the adhesive layer 2 can be kept intact until application of the multilayer coating on a substrate, preferably on one or more vehicle body parts. In preferred embodiments, the liner 1 is a paper film, polymer film, such as, for example, a polyester, polyethylene, or polypropylene film, and/or another polymeric film material. A preferred embodiment of a multilayer coating including a liner 1 and protective layer 5 is shown in FIG. 1. The liner 1 comprises a corresponding layer thickness x1 while the protective layer 5 comprises a corresponding layer thickness x5. In preferred embodiments, the weight of the liner 1 is 15 g/m2 or more, more preferably 25 g/m2 or more and even more preferably from 40 to 165 g/m2. When the weight is within the range, the removability of the liner 1 from the adhesive layer 2 is satisfactory and enables a good working efficiency. When the weight is lower than 15 $g/m^2$, it becomes difficult to remove the liner 1, because of tearing of the liner 1, which may result in some parts of the liner 1 that stay on the adhesive layer 2. In preferred embodiments, the layer thickness x5 of the protective layer 5 is selected between 1 and 30 μm, more preferably between 5 and 25 μm, and even more preferably between 10 and 20 μm. Said thickness x5 values of the protective layer 5 ensure sufficient protection of the top coat layer 4 from the environment while avoiding an unnecessary thick protective layer 5.

Figure 3:
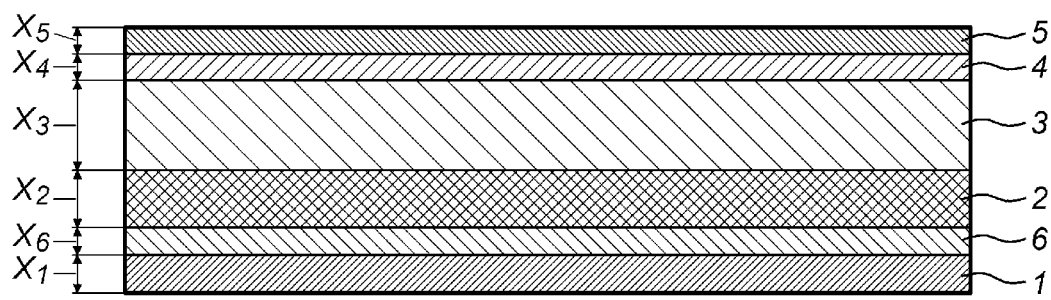

In preferred embodiments, the liner 1 may be coated with a release coating 6 to decrease the amount of adhesion between the liner 1 and the adhesive layer 2. Such release coating 6 can comprise, for example, a silicone or fluorochemical material. A preferred embodiment of a multilayer coating including a release coating 6 is shown in FIG. 3. The release coating comprises a corresponding layer thickness x6. In preferred embodiments, the layer thickness x6 of the release coating 6 is selected between 0.1 and 30 μm, more preferably between 0.5 and 10 μm, and even more preferably between 0.7 and 2.0 μm. Said thickness x6 values of the release coating 6 ensure sufficient decrease of the amount of adhesion between the liner 1 and the adhesive layer 2 while, at the same time, remaining attachment of the liner 1 with regard to the adhesive layer 2.

In embodiments, one or more layers of the multilayer coating comprise, if desired, other optional materials well known in the art of formulated surface coatings, such as plasticizers, anti-oxidants, hindered amine light stabilizers, UV light absorbers and stabilizers, surfactants, flow control agents, thixotropic agents such as bentonite clay, fillers, organic cosolvents, catalysts, including phosphonic acids, and other customary auxiliaries.

In certain embodiments, multilayer coating compositions described herein also comprise a colorant. The colorant can be added to the coating in any suitable form, such as discrete particles, dispersions, solutions and/or flakes. A single colorant or a mixture of two or more colorants can be used in the multilayer coating. Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the multilayer coating by use of a grind vehicle, such as an acrylic grind vehicle, the use of which will be familiar to one skilled in the art. Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red, titanium dioxide, carbon black and mixtures thereof. The terms "pigment" and "colored filler" can be used interchangeably. Example dyes include, but are not limited to, those that are solvent and/or aqueous based such as pthalo green or blue, iron oxide, bismuth vanadate, anthraquinone, perylene, aluminum and quinacridone. Example tints include, but are not limited to, pigments dispersed in water-based or water miscible carriers. As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a colour shift, such that the color of the coating changes when the coating is viewed at different angles. Additional color effect compositions can include transparent coated mica and/or synthetic mica, coated silica, coated alumina, a transparent liquid crystal pigment, a liquid crystal coating, and/or any composition Wherein interference results from a refractive index differential within the material and not because of the refractive index differential between the surface of the material and the air. In certain embodiments, a photosensitive composition and/or photochromic composition, which reversibly alters its colour when exposed to one or more light sources, can be used.

In a preferred embodiment, the multilayer coating according to the first aspect of the present invention comprises an ink layer 7 between the facestock layer 3 and the top coat layer 4. The ink layer 7 is intended to provide an additional aesthetical effect to the multilayer coating or to display a visible message. The ink layer 7 may be one layer or may comprise a multitude of sub-layers. The ink layer 7 may be formed from one or more of a wide variety of different inks, provided that the resultant layer 7 possesses an acceptable degree of adhesion to both facestock layer 3 and top coat layer 4. Preferably, the ink layer 7 is printed using an ink comprising a polyvinylchloride resin. The polyvinylchloride resin may encompass polyvinylchloride homopolymers and/or copolymers of vinylchloride. An example of a preferred polyvinylchloride-comprising ink comprises 100 parts of ink, 5 parts of polyvinylchloride resin and 1 part zinc oxide as a cross-linker.

Figure 4:
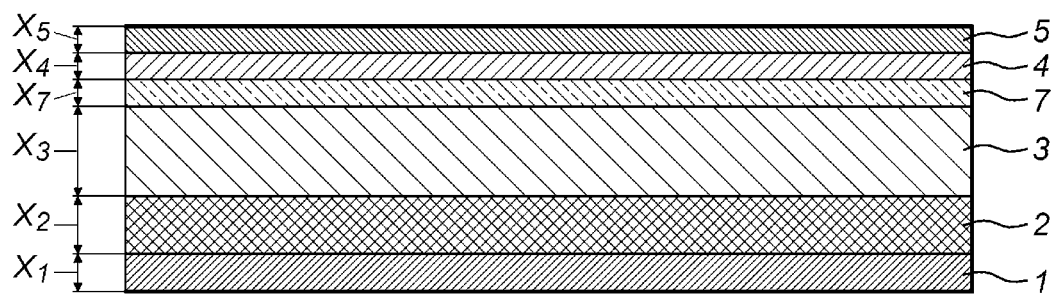
Figure 5:
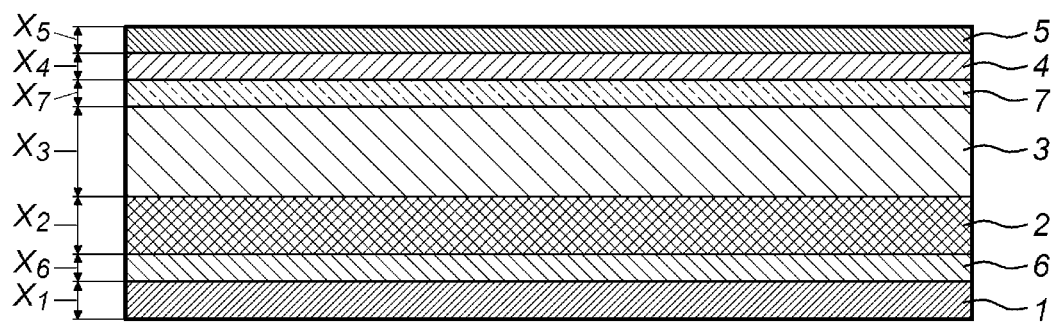
Figure 6:
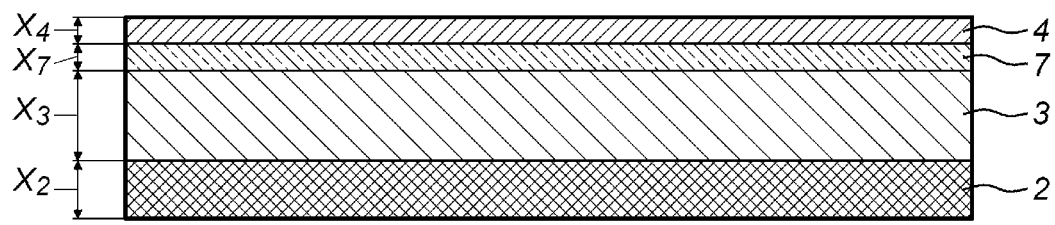

Preferred embodiments of a multilayer coating including an ink layer 7 are shown in FIGS. 4-6. The ink layer 7 comprises a corresponding layer thickness x7. In preferred embodiments, the layer thickness x7 of the ink layer 7 is selected between 0.05 and 30 μm, and more preferably between 1 and 20 μm. Said thickness x7 values of the ink layer 7 ensure sufficient visibility of the ink layer 7 within the multilayer coating while avoiding an unnecessary thick ink layer 7 and thus avoiding an excessive application of ink. In embodiments, the ink layer 7 is formed in the conventional manner by depositing, preferably by screen printing, one or more ink compositions onto one or more desired areas of the facestock layer 3 and or top coat layer 4 and, thereafter, allowing any volatile components of the one or more ink compositions to evaporate, leaving only the non-volatile ink components to form the ink layer 7. In the case of the above-described polyvinylchloride-comprising ink, there are no such volatile components, but the printed layer must be heated, typically in an IR or UV oven, to fuse or "cure" the layer.

In a preferred embodiment, the present invention provides a multilayer coating according to the first aspect of the invention, wherein the top coat layer 4 has a haze of less than 15%, more preferably less than 12%, and even more preferably less than 10% after 500 taber cycles, as measured at a wavelength ranging from 410 nm to 700 nm according to ASTM D-1003. Such measurement is executed to determine the "self-healing" of the top coat layer 4 in terms of the property of the top coat layer 4 to return to its original shape or appearance after being scratched. Due to the specific at least partially cross-linked polyurethane in the top coat layer 4 according to the first aspect of the present invention, the top coat layer 4 and thus the multilayer coating is able to display such excellent self-healing properties.

In a preferred embodiment, the present invention provides a multilayer coating according to the first aspect of the invention, wherein the top coat layer 4 has a spectral transmission of at least 80%, more preferably of at least 85%, and even more preferably of at least 90% at a wavelength ranging from 410 nm to 700 nm according to ASTM D-1003. Such measurement is executed to determine the transparency of the top coat layer 4. Due to the specific composition of the top coat layer 4, this layer 4 shows a high transparency which is desirable for the multilayer coating, since it enables sufficient visibility of the other layers of the multilayer coating.

In a preferred embodiment, the present invention provides a multilayer coating according to the first aspect of the invention, wherein the top coat layer 4 has an elongation at break of at least 20%, more preferably of at least 50% and even more preferably of at least 80% when measured according to ASTM D638-95. Such measurement is executed to determine the stretchability of the top coat layer 4. Due to the specific composition of the top coat layer 4, this layer 4 shows a high stretchability which is desirable for the multilayer coating, since it enables to use the multi-layered product on curved and/or 3D surfaces.

In a preferred embodiment, the present invention provides a multilayer coating according to the first aspect of the invention, wherein the top coat layer 4 has a solvent resistance of at least 100 and more preferably of at least 200 when measured by MEK double rubs in accordance with ASTM D5402. Due to the specific composition of the top coat layer 4, this layer 4 shows a high solvent resistance which is desirable for the multilayer coating, since it enables the top coat layer 4 to maintain its appearance after contact with solvents.

In a second aspect, the present invention concerns a method for manufacturing a multilayer coating for covering vehicle body parts, comprising the steps of:
  providing a polymeric facestock layer 3;
  providing a polymeric adhesive layer 2;
  providing a polymeric top coat layer 4;
  sandwiching the facestock layer 3 between the top coat layer 4 and the adhesive layer 2,
  wherein the step of providing the top coat layer 4 comprises the following steps:
    adding thermally curable polyurethane precursor material to solvent or water to obtain a first dispersion or solution;
    adding UV-curable polyurethane precursor material to the solvent- or waterborne polyurethane obtained in step a) to obtain a second dispersion or solution;
    coating the mixture obtained in step 2 on the polymeric facestock 3;
    heating the mixture once coated in such a way that water and/or solvent is evaporated and the polyurethane described in step a) is at least partially cross-linked;
    Submitting the mixture resulting from step d) to UV radiation in such a way that the polyurethane described in step b) is at least partially cross-linked.

The solvent- or waterborne polyurethane hinders full curing of the UV-curable polyurethane precursor material. In such way, a top coat layer 4 comprising at least partially cross-linked polyurethane is formed that provides excellent stretchability, anti-scratch and solvent resistance properties. As a result, a multilayer coating resulting from the method according to the second aspect of the present invention provides excellent stretchability, anti-scratch and solvent resistance properties and is thus especially suitable for covering and protecting vehicle body parts. The specific manner to provide the top coat layer 4 as part of the multilayer coating according to the present invention is not to be regarded as obvious for a person skilled in the art, since such person would rather try to optimize solvent-based or UV-based technologies for creating an improved protective coating instead of combining solvent-based and UV-based technologies.

In preferred embodiments, the UV-curable polyurethane precursor material used in the method according to the second aspect of the present invention comprises one or more acrylate polymers, diisocyanates, polyisocyanates, diols, polyols, diamines, polyamines, and/or one or more compounds containing one or more functional groups reactive towards isocyanate groups. Such UV-curable polyurethane precursor materials provide excellent cross-linking properties and are hence optimally suitable for obtaining the at least partially cross-linked polyurethane of the top coat layer 4.

In preferred embodiments, the polymeric facestock layer 3 is provided by extruding one or more thermoplastic polymers selected from the group comprising polyurethane, polyester and polyvinylchloride at an elevated temperature through an extrusion die. In other preferred embodiments, the polymeric facestock layer 3 is provided by casting or otherwise molding of such thermoplastic polymers into a roll. Such thermoplastic polymers are optimally suited to provide a facestock layer 3 with good strength and flexibility properties. In especially preferred embodiments, the polymeric facestock layer is provided by extruding at an elevated temperature through an extrusion die or by casting or otherwise molding of (i) long-chain polyols, being defined as polyols with at least three alcohol groups, (ii) short-chain polyols also called chain-extenders, being defined as diols, and (iii) polyisocyanate. In such way, a facestock layer 3 comprising biphasic thermoplastic polyurethane with hard and soft segments is created, the hard segments formed by reaction between the chain extenders and isocyanates, and the soft segments formed by reaction between the long-chain polyols and the isocyanates. The hard and polar segments form domains of about 10 nm based on carbonyl to amino hydrogen bonds whereas the soft segments form amorphous domains. The biphasic structure of the thermoplastic polyurethanes gives the facestock layer 3 good flexibility properties and shape memory behaviour and thus allows the facestock layer 3 to assist in the self-healing properties of the adjacent top coat layer 4. In preferred embodiments, aliphatic polycaprolactone is also applied for manufacturing and thus providing the facestock layer 3, which polycaprolactone beneficially enhances the hardness of the facestock layer 3. In another preferred embodiment, polyethylene terephthalate, preferably UV-stabilized polyethylene terephthalate, is applied for manufacturing and thus providing the facestock layer 3.

In preferred embodiments, the adhesive layer 2 is provided by providing a polymeric adhesive. In preferred embodiments, the polymeric adhesive layer 2 is provided by an acrylic-based adhesive. Furthermore, in preferred embodiment, the provided polymeric adhesive layer 2 comprises a pressure-sensitive adhesive. The multilayer coating resulting from the method according to the second aspect of the present invention can be applied to a substrate, preferably to one or more vehicle body parts, by said adhesive layer 2.

In preferred embodiments, the method according to the second aspect of the present invention comprises the addition of one or more additional layers. In a preferred embodiment, a protective layer 5 is applied to a major surface of the top coat layer 4 which is opposite to the facestock layer 3. Said protective layer 5 primarily functions to protect the top coat layer 4 from detrimental environmental conditions, such as from dirt or from hands which manipulate the multilayer coating when it is applied to a structure, preferably to one or more body parts of a vehicle. The multilayer coating is intended to be removed once the multilayer coating is applied to a surface to be coated. In preferred embodiments, the protective layer 5 is a polyester or a polypropylene film. In other embodiments, the protective layer 5 comprises polyvinylidene fluoride, polyurethane, polyvinylchloride or another material. In a preferred embodiment, a liner 1 is applied to a major surface of the adhesive layer 2 and opposite to the facestock layer 3. The liner 1 functions to shield of the adhesive layer 2 from the environment. In such way, the adhesive strength of the adhesive layer 2 can be kept intact until application of the multilayer coating on a substrate, preferably on one or more vehicle body parts. In preferred embodiments, the liner 1 is a paper film, polymer film, such as, for example, a polyester, polyethylene, or polypropylene film, and/or another polymeric film material. In a preferred embodiment, a release coating 6 is applied to a major surface of the liner 1 which is facing the facestock layer 3. The release coating functions to decrease the amount of adhesion between the liner 1 and the adhesive layer 2. Such release coating 6 can comprise, for example, a silicone or fluorochemical material. In a preferred embodiment, an ink layer 7 is provided between the facestock layer 3 and the top coat layer 4. The ink layer 7 is intended to provide an additional aesthetical effect to the multilayer coating or to display a visible message. The ink layer 7 may be one layer or may comprise a multitude of sub-layers. The ink layer 7 may be formed from one or more of a wide variety of different inks, provided that the resultant layer 7 possesses an acceptable degree of adhesion to both facestock layer 3 and top coat layer 4. Preferably, the ink layer 7 is printed using an ink comprising a polyvinylchloride resin. The polyvinylchloride resin may encompass polyvinylchloride homopolymers and/or copolymers of vinylchloride. An example of a preferred polyvinylchloride-comprising ink comprises 100 parts of ink, 5 parts of polyvinylchloride resin and 1 part zinc oxide as a cross-linker.

In a preferred embodiment, the present invention provides a method according to the second aspect of the invention, wherein the second dispersion comprises between 20.0 and 60.0 wt. %, more preferably between 30.0 and 50.0 wt. %, and even more preferably between 32.0 and 42.0 wt. % of said solvent- or waterborne polyurethane and between 40.0 and 80.0 wt. %, more preferably between 50.0 and 70.0 wt. %, and even more preferably between 58.0 and 68.0 wt. %, of said UV-curable polyurethane precursor material, as based on the total weight of said second dispersion. In a preferred embodiment, the present invention provides a method according to the second aspect of the invention, wherein the second dispersion comprises between 20.0 and 99.9 wt. % of said solvent- or waterborne polyurethane and between 0.1 and 80.0 wt. % of said UV-curable polyurethane precursor material, as based on the total weight of said second dispersion. Said amounts of solvent- or waterborne polyurethane and UV-curable polyurethane precursor material are optimally suited for obtaining a top coat layer 4 comprising at least partially cross-linked polyurethane that provides surpassingly excellent stretchability, anti-scratch and solvent resistance properties.

EXAMPLES

Preferred embodiments of the invention are disclosed in the following Examples (Ex.) 1-5. The following Table 1 presents the composition of the different layers of multilayer coatings according to the Examples 1-5. The Examples are not to be considered as limiting the invention to their details. All parts and percentages in the Examples, as well as throughout the text, are by weight unless otherwise indicated.

Materials

Following materials were used in the Examples:
- a polycarbonate-based solvent-borne aliphatic polyurethane, comprising at least 15% and less than 20% 1-methoxy-2-propanol, at least 15% and less than 20% propan-2-ol and at least 5% and less than 7% isobutyl acetate;
- an unsaturated aliphatic urethane acrylate resin, comprising approximately 100% unsatured aliphatic urethane acrylate and less than 0.25% dibutyltin dilaurate;
- an oligomeric polyfunctional α-hydroxyketone UV cross-linker, comprising 60-100% oligo[2-hydroxy-2-methyl-1-[4-(1-methylvinyl)phenyl]propanone] and 10-30% tripropylene glycol diacrylate; and
- a black opaque pressure-sensitive laminate, comprising a polyvinylchloride (PVC) facestock layer and an acrylate-based pressure-sensitive adhesive.

Test Methods

Maximum Elongation

Maximum elongation is measured following ISO 527. Sample dimensions: 150 mm total, 50 mm between tensile tester jaws. Before carrying out the test, protective liner is removed. Elongation speed: 100 mm/min. A sample of the pressure-sensitive laminate coated with the top coat is stretched till top coat breaks. This is clearly visible as lines appear perpendicular to the stretching direction. Length is recorded and maximum elongation expressed as percentage of initial length. Example: initial length: 50 mm, top coat failure at 70 mm, maximum elongation is (70-50)/50× 100=40%.

Solvent Resistance

Solvent resistance is assessed according to ASTM D5402. Only the visual appearance after testing is reported as pass (no difference between initial product and rubbed surface) or fail (visual difference between initial product and rubbed surface). Solvent used is Isopropyl Alcohol as this product is often used as degreasing agent by applicators when they are covering a car with pressure-sensitive material.

Scratch Resistance and Self-Healing

A sample of the pressure-sensitive laminate coated with the top coat is submitted to abrasion. To do this, protective liner is removed and the sample is stuck onto an aluminum plate. This plate is then mounted into a washability tester "Elcometer 1720", available from Elcometer Ltd, Edge Lane, Manchester, M43 6BU, United Kingdom. A 55 mm×30 mm brush with brass bristles having a weight of 572 grams is then passed 10 times (5 back and forth cycles) on the sample at speed of 15 cycle/min. Time needed to recover initial aspect is then evaluated at room temperature and immersed in warm water (50° C.). As this measurement is based on visual inspection, large variations are observed. Therefore, assessment will be "seconds" (between 1 and 59 seconds), "minutes" (between 1 and 59 minutes), "hours" (between 1 and 24 hours) or "days" (more than 24 hours).

Preparation of Samples and Results

Components are diluted 2:1 with Methyl Ethyl ketone (MEK) for easier handling and mixing. The amounts indicated in Table 1 are mixed together. Resulting liquid is applied with a lab coater equipped with a blade on the pressure-sensitive laminate. The gap between the substrate and the blade is adjusted to obtain 15 g/sqm of dried top coat. It is allowed to dry during 30 seconds at 105° C. in a forced air oven. It is then submitted to UVc radiation under Nitrogen blanket.

TABLE 1

Effect of ratio Thermal/UV crosslinking

| Formula # | Ex. 1 | Ex. 2 | Ex. 3 | Ex. 4 | Ex. 5 |
|---|---|---|---|---|---|
| polycarbonate-based solvent-borne aliphatic polyurethane [g liquid] | 40.3 | 69.0 | 79.0 | 89.5 | 100 |
| unsaturated aliphatic urethane acrylate resin [g liquid] | 56.9 | 29.5 | 20.0 | 10.0 | 0 |
| oligomeric polyfunctional α-hydroxyketone UV crosslinker [g liquid] | 2.8 | 1.5 | 1.0 | 0.5 | 0 |
| Maximum elongation [%] * | 80 | 96 | 122 | 141 | 200 |
| Solvent resistance | Pass | Pass | Pass | Fail | Fail |
| Self-healing at room temperature | N/A (no abrasion) | Days | Days | Days | Days |
| Self-healing at 50° C. | N/A (no abrasion) | Minutes | Seconds | Seconds | Seconds |

* Maximum elongation of PVC without top coat is 200%

What is claimed is:

1. A method for manufacturing a multilayer coating for covering vehicle body parts, essentially comprising the steps of:
   (a) providing a polymeric facestock layer;
   (b) providing a polymeric adhesive layer;
   (c) providing a polymeric top coat layer; and
   (d) sandwiching the polymeric facestock layer between the polymeric top coat layer and the polymeric adhesive layer,
   wherein the step (c) of providing the polymeric top coat layer comprises the following steps:
   (c-i) adding thermally curable polyurethane precursor material to solvent or water to obtain a first dispersion or solution;
   (c-ii) adding UV-curable polyurethane precursor material to the first dispersion or solution obtained in step (c-i) to obtain a second dispersion or solution;
   (c-iii) coating the second dispersion or solution obtained in step (c-ii) on the polymeric facestock layer;
   (c-iv) heating the second dispersion or solution coated on the polymeric facestock layer in step (c-iii in such a way that water and/or solvent is evaporated and the thermally curable polyurethane precursor described in step (c-i) is at least partially cross-linked; and
   (c-v) submitting the second dispersion or solution resulting from step (c-iv) to UV radiation in such a way that the UV-curable polyurethane precursor described in step (c-ii) is at least partially cross-linked to obtain the multilayer coating.

2. The method according to claim 1, wherein the second dispersion or solution comprises between 40.0 wt % and 90.0 wt % of said thermally curable polyurethane precursor material and between 10.0 and 60.0 wt. % of said UV-curable polyurethane precursor material, as based on the total weight of said second dispersion.

3. The method according to claim 1, wherein the thermally curable polyurethane precursor material is a polycarbonate-based solvent-borne aliphatic polyurethane.

4. The method according to claim 1, wherein the UV-curable polyurethane precursor material is an unsaturated aliphatic urethane acrylic resin.

5. The method according to claim 1, wherein the polymeric facestock layer comprises a thermoplastic polymer selected from the group consisting of polyurethane, polyvinylchloride, and combinations thereof.

6. The method according to claim 1, wherein the polymeric adhesive layer comprises an acrylic based pressure sensitive adhesive.

7. The method according to claim 1, wherein the thickness of:
   the polymeric topcoat layer is in the range of 1 μm to 30 μm;
   the polymeric facestock layer is in the range of 10 μm to 300 μm; and
   the polymeric adhesive layer is in the range of 10 μm to 200 μm.

8. The method according to claim 1 further comprising:
   the step of providing a protective layer adjacent to the top coat layer and opposite to the facestock layer;
   the step of providing a liner adjacent to the adhesive layer and opposite to the facestock layer; and
   the step of providing an ink layer between the facestock layer and the top coat layer.

9. The method according to claim 8, further comprising providing a release coating layer between the liner and the adhesive layer.

10. The method according to claim 1, wherein the thermally curable polyurethane precursor described in step (c-iv) is partially cross-linked.

11. The method according to claim 1, wherein the UV-curable polyurethane precursor described in step (c-v) is partially cross-linked.

12. The method according to claim 1, wherein the step (a) of providing a polymeric facestock layer comprises extruding thermoplastic polymer through an extrusion die, casting or molding of: (i) long-chain polyols with at least three alcohol groups, (ii) short-chain polyols selected from diols, and (iii) polyisocyanate.

13. The method according to claim 1, wherein the facestock layer comprises biphasic thermoplastic polyurethane with hard and soft segments, wherein the hard segments formed by reaction between the chain extenders and isocyanates, and the soft segments formed by reaction between the long-chain polyols and the isocyanates.

\* \* \* \* \*